(12) United States Patent
Schlachter

(10) Patent No.: US 6,976,513 B2
(45) Date of Patent: Dec. 20, 2005

(54) VEHICLE HOOD FUEL FILLER, FUEL FILLER PIPE, AND OVERFLOW TRAY

(76) Inventor: Mark David Schlachter, 10366 Decoursey Pike, Covington, KY (US) 41015

( * ) Notice: Subject to any disclaimer, the term of this patent is extended or adjusted under 35 U.S.C. 154(b) by 0 days.

(21) Appl. No.: 10/796,828

(22) Filed: Mar. 8, 2004

(65) Prior Publication Data

US 2004/0256024 A1  Dec. 23, 2004

Related U.S. Application Data

(60) Provisional application No. 60/452,846, filed on Mar. 7, 2003.

(51) Int. Cl.$^7$ ................................................. B65B 1/04
(52) U.S. Cl. ......................... 141/88; 141/86; 220/86.2
(58) Field of Search ................................ 141/2, 18, 86, 141/88, 115; 220/86.2; 180/314, 89.1; 296/97.22, 296/189; 280/834

(56) References Cited

U.S. PATENT DOCUMENTS

| | | | |
|---|---|---|---|
| 4,279,320 A * | 7/1981 | Brandl et al. ............... | 180/69.2 |
| D466,063 S | 11/2002 | Schlachter .................. | D12/196 |
| D469,393 S | 1/2003 | Schlachter .................. | D12/196 |
| 6,619,337 B1 * | 9/2003 | Vickers ........................ | 141/98 |

OTHER PUBLICATIONS

Mark Schlachter, Dean's Dream, *Bent Pylon*: Ohio Valley Region / Porsche Club of America; Sep. 2001.
*911 & Porsche World*; Apr. 2002.
Keith Seume, Past Master, *911 & Porsche World*; May 2002.
Brochure: "Days gone by mark days to come".
Brochure: " . . . an extraordinary 550 Spyder-inspired Boxster . . . ".
Dean's Dream, Ltd., Racing Fuel Filler web page, http://www.deansdream.net/pages/racingfuelfiller.htm.

* cited by examiner

Primary Examiner—Timothy L. Maust
(74) Attorney, Agent, or Firm—Wood, Herron & Evans, LLP

(57) ABSTRACT

A center-filled fuel filler system and method for constructing same comprising a vehicle comprising a fuel filler receptacle, a fuel filler receptacle cap operably attached to the fuel filler receptacle, an apertured vehicle hood, the fuel filler receptacle cap protruding through the apertured vehicular hood, a spill tray attached to the fuel receptacle, an overflow pipe attached to the overflow tray to channel liquid away from the overflow tray, an apertured luggage compartment wall, and a fuel filler line, comprised of a curved L-shaped metal pipe, attached to the fuel filler receptacle and extending through the apertured luggage compartment wall. The method for positioning a fuel filler system in a vehicle utilizes an existing aperture in the luggage compartment wall, such that no additional apertures are made in the luggage compartment wall to route the fuel line.

2 Claims, 3 Drawing Sheets

VEHICLE HOOD FUEL FILLER, FUEL FILLER PIPE, AND OVERFLOW TRAY

CLAIM OF PRIORITY

This application claims priority to U.S. Provisional Application Ser. No. 60/452,846 filed on Mar. 7, 2003 and hereby incorporates by reference that application in its entirety.

FIELD OF THE INVENTION

The present invention relates to fuel filler receptacles, fuel filler receptacle doors or caps, fuel filler pipes, and overflow trays for a motorized vehicle.

BACKGROUND OF THE INVENTION

Vehicle fuel receptacle doors or caps, i.e., gasoline caps, and their associated fuel filler pipes are well known. Traditionally, a gas cap, or the door to access the gasoline receptacle, was located on the rear of vehicle along with a fuel filler pipe which connects the gas receptacle to the vehicle's fuel or gasoline tank. As an alternative to positioning the fuel receptacle at the rear of a vehicle, gas caps and receptacles have been positioned on a rear quarter panel or side of the vehicle. Gas caps and receptacles have also been located on the center of vehicle's hood. This placement is desirable for both functional and aesthetic reasons. Functionally, a center filled gas tank allows the vehicle to be refilled with equal convenience from either side of the vehicle. Additionally, if the driver is using a full service pump, he or she can easily monitor the entire refueling operation, thus reducing the chance that the wrong fuel will be transferred or that the wrong amount will be charged.

Moreover, in the racing environment, race cars may have the gasoline cap located on the center of the race car's hood. This also provides for expeditious refilling of the fuel tank from either side of the vehicle, and depending on the placement of the fuel pipe and fuel tank under the hood, can also allow for faster transfer of fuel, as the gas may not have to flow through a long fuel line from the fuel filler receptacle to the fuel tank. Additionally, the race car driver can easily monitor the refueling process, and know precisely when that process is completed, so no unnecessary time is wasted during a pit stop.

In addition, centering a gas cap on a hood at an approximately equal distance from either side of the vehicle contributes to the overall symmetry of the vehicle. For example, the side panels will now be identical as no fuel filler door, which breaks up the clean lines of vehicle, is needed. Finally, the location of the fuel filler receptacle cap on a vehicle's hood helps to create a more classic look to the vehicle, as certain historic or classic automobiles also placed the gasoline cap at a similar location.

Despite these advantages to a hood-centered fuel filler system, there are practical problems in creating such a system in a new vehicle, or modifying an existing vehicle. In either case, the rerouting of fuel lines can require expensive and time consuming modifications to a vehicle. For example, a hole may need to be cut in the luggage compartment wall to enable proper routing of the fuel filler pipe from the fuel receptacle to the fuel tank.

Also, the resulting vehicle is likely to have gasoline spilled on the hood. While such spills may not be a great concern in a racing environment, it is not acceptable for a non-racing vehicle.

SUMMARY OF THE INVENTION

The present invention recreates a classic hood gas cap look by locating the gas cap in the center of the hood, and by doing this in a practical, cost-effective and aesthetically pleasing way.

DESCRIPTION OF THE INVENTION

Figure 1:
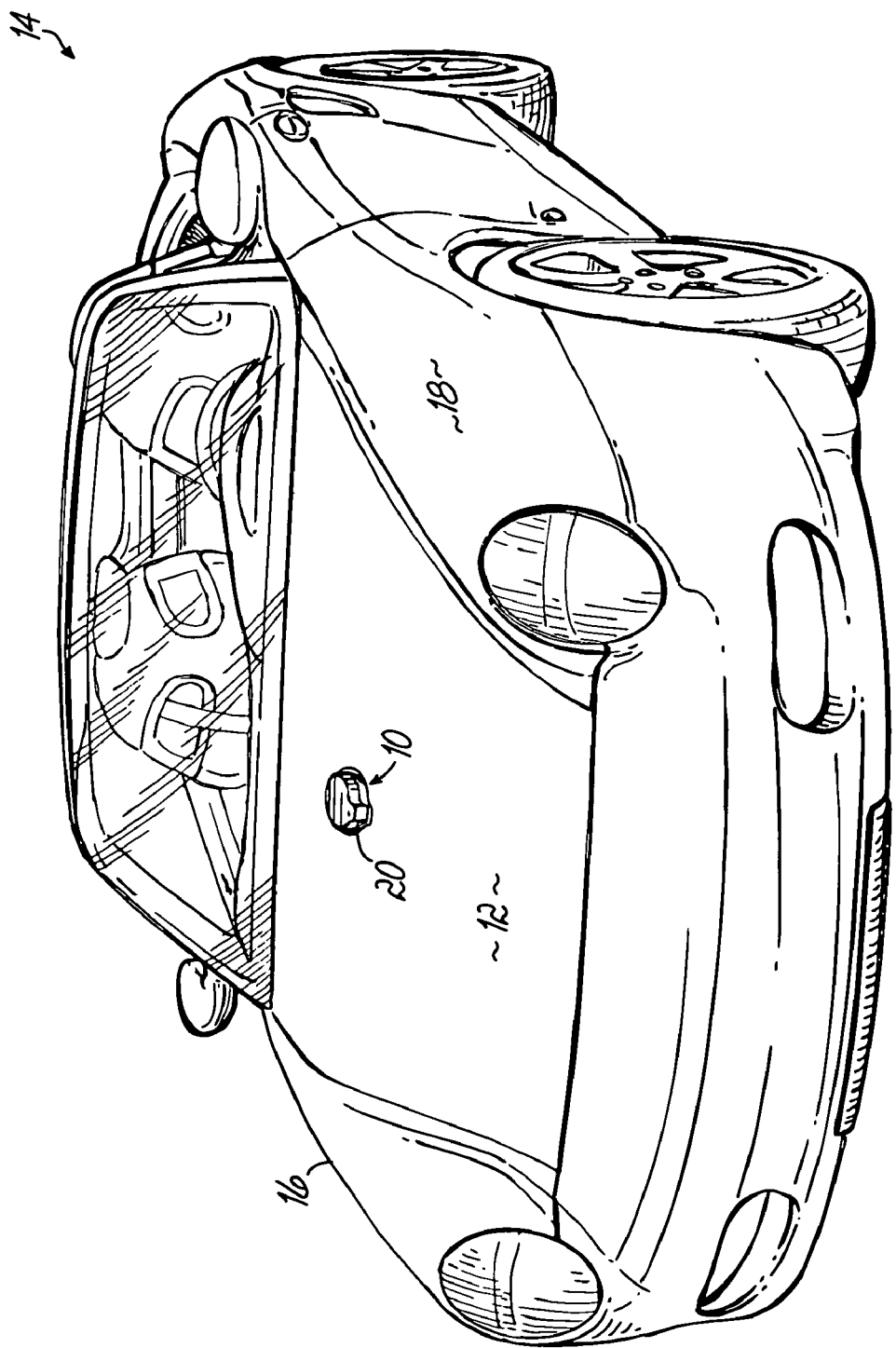
FIG. 1 is a perspective view of a vehicle with a hood fuel receptacle and cap according to the present invention.

As shown in FIG. 1, the present invention positions a fuel filler receptacle cap 10, i.e., the gasoline or gas cap, on the hood 12 of vehicle 14 at a location approximately equal distance from either side 16, 18 of the vehicle 14. A hole 20 is cut in the hood 12 whereby the gas cap 10 accessible without having to raise the hood 12.

Figure 2:
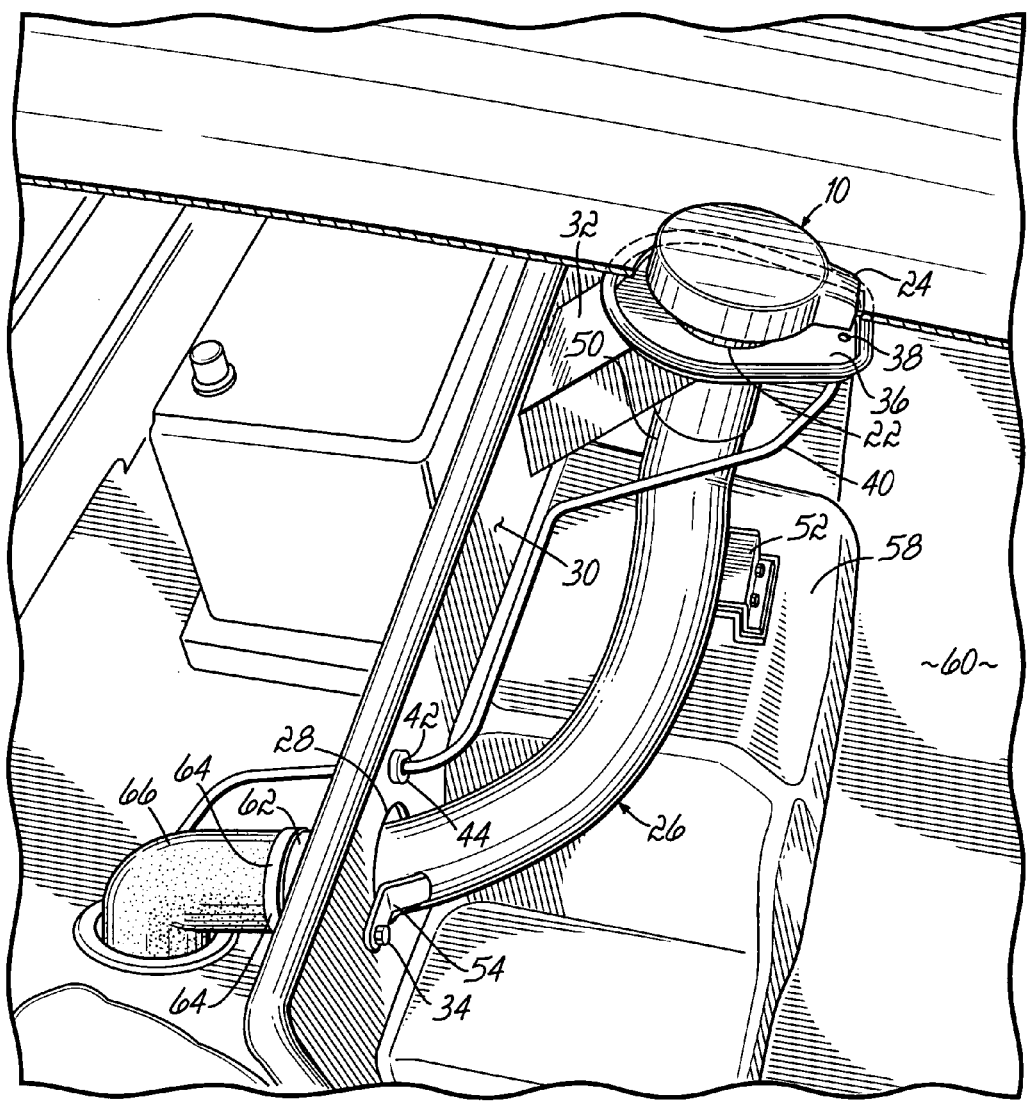
FIG. 2 is a perspective view of the fuel filler pipe shown in FIG. 1 with the hood of the vehicle raised.

As shown in FIG. 2, the gas cap 10 can be operationally attached to a fuel filler receptacle 22 by a hinge, screw, bayonet mount, or other like mechanism 24. A fuel filler pipe or line 26 connects the fuel filler receptacle 22 to the fuel tank (not shown) via an aperture 28 in the luggage compartment wall 30. In the embodiment shown, this luggage compartment wall aperture 28 is preexisting in this particular vehicle (a Boxster manufactured by Porsche), as it is the hole where a brake master cylinder would be placed if the driver's seat was desired to be located on the starboard side of the vehicle, as would be the case for a vehicle designed for use in the United Kingdom or for mail delivery in this country.

Figure 4:
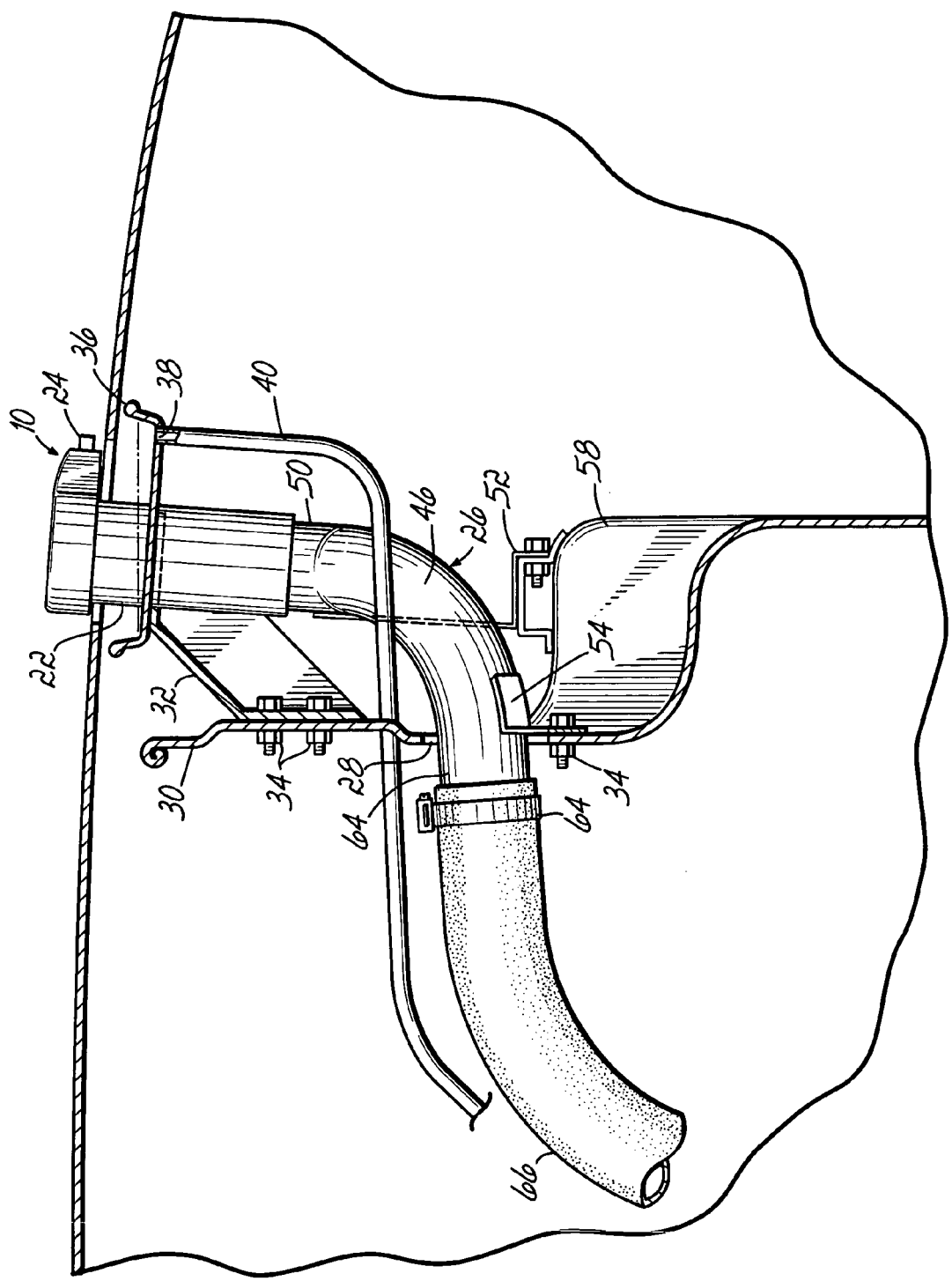
FIG. 4 is a partial cross-sectional view of the fuel filler cap, drain pan and drain line shown in FIG. 2.

As shown in FIGS. 2 & 4, the fuel filler receptacle 22 is supported by a brace 32 which is attached to the luggage compartment wall 30. Due to other preexisting apertures in the luggage compartment wall 30, the brace 32 can be able to be mounted to the wall 30 without the additional drilling of mounting holes. Standard bolts, screws, or other like fasteners 34 may be used to mount the brace 32 to the luggage compartment wall 30.

The fuel receptacle 22 contains an overflow or spill tray or drain pan 36 that extends around the fuel receptacle 22 and gas cap 10. The overflow tray 36 has a drain 38 and an attached overflow or drain line or pipe 40 which can channel spilt fuel or moisture away. The drain pipe 40 is adapted to pass through another preexisting aperture 42 in the luggage compartment wall 30. A rubber washer or gasket 44 can be used to brace the drain pipe 40 against the aperture 42 in the luggage compartment wall 30.

Figure 3:
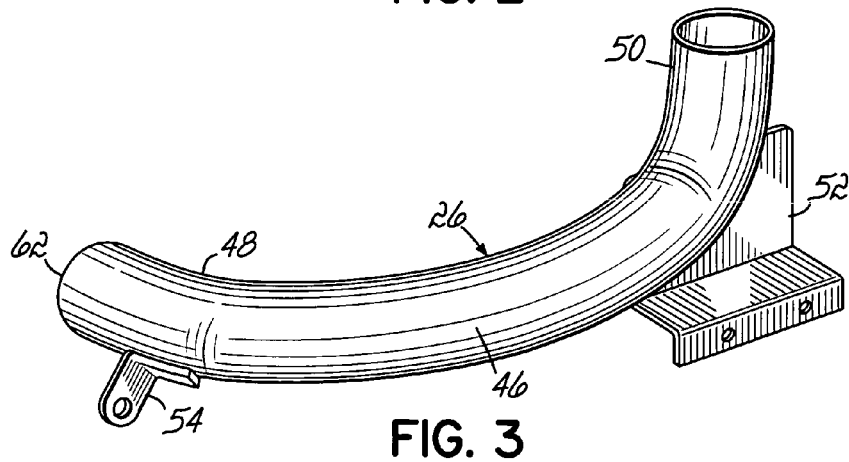
FIG. 3 is a perspective view of the fuel filler pipe shown in FIG. 2.

As shown in FIGS. 2–3, the L-shaped curved metal fuel filler pipe 26 is designed to particularly fit the size and openings of both a Porsche Boxster and 996. The long leg 46 of the pipe 26 is designed to span the generally horizontal center-to-side distance from the center mounted fuel receptacle 22 to the preexisting and unused brake master cylinder aperture 28 in the luggage compartment wall 30. The curve 48 in the long leg 46 is designed to span the generally horizontal front-to-back distance from the position of the fuel receptacle 22 and cap 10 to the luggage compartment wall 30. Finally, the short end 50 of the L-shaped fuel pipe 26 is designed to span the generally vertical distance required to allow the fuel receptacle 22 to be mounted so that the gas cap 10 protrudes through the aperture 20 in the vehicle's hood 12. While shown in a Porsche Boxster, the dimensions of the fuel pipe 26 in other embodiments of the present invention can be adjusted to meet the parameters of another vehicle.

The fuel pipe 26 also contains two mounting brackets 52, 54. A larger mounting bracket 52 is located on the elbow 58 of the fuel pipe 26 and allows the pipe 26 to be braced against an existing metal wall 58 in the luggage compartment 60. A smaller mounting bracket 54 is located near the end 62 of the fuel pipe 26 that will pass through the unused brake master cylinder aperture 28. Another preexisting aperture is used to secure the mounting bracket 54 to the luggage compartment wall 30, thus fixedly securing the fuel pipe 26.

The fuel filler pipe 26, as shown in the present embodiment, may further utilize clamps 64 to aid in the coupling of the pipe to other components, i.e., the sleeve 66 that extends into the gas tank (not shown). Additionally, while the embodiment shown utilizes a metal fuel pipe 26, a metal gas cap 10, a metal fuel receptacle 22, a metal spill tray 36, and a metal drain pipe 40, other materials, such as rubber, plastic, or the like, or a combination of materials, can be used in other embodiments. Moreover, while the description of the embodiments shown have generally referred to gasoline or gas, other types of fuel, e.g., alcohol, could also be used. Similarly, the system herein described could be used equally as well for other non-traditional fuel applications. For example, according to the principles of the present invention, water or another chemical could be routed to a storage tank in a vehicle. Additionally, conduit and wires for an electric or hybrid vehicle could be routed through the luggage compartment wall 30.

While the present invention has been illustrated in a Porsche Boxster 14, the invention is not limited to that particular vehicle, but could be applied to the Porsche 996 and in other similarly configured vehicles. Additional advantages and modifications will readily appear to those skilled in the art. The invention in its broader aspects is, therefore, not limited to the specific details shown and described.

Having described a presently preferred embodiment of the invention, I claim:

1. A fuel filler system for a vehicle comprising:
   a fuel filler receptacle;
   a fuel filler receptacle cap operably attached to the fuel filler receptacle and adapted to be located in the center of the hood of the vehicle;
   an apertured luggage compartment wall;
   a fuel filler line attached to the fuel filler receptacle and extending through the apertured luggage compartment wall;
   an overflow tray attached to the fuel receptacle; and
   an overflow pipe attached to the overflow tray, whereby spilt fuel or moisture is channeled away.

2. A fuel filler system for a vehicle comprising:
   a fuel filler receptacle;
   a fuel filler receptacle cap operably attached to the fuel filler receptacle;
   an apertured vehicle hood, the fuel filler receptacle cap protruding through the apertured vehicle hood;
   a spill tray attached to the fuel receptacle;
   an overflow pipe attached to the overflow tray to channel liquid away from the overflow tray;
   an apertured luggage compartment wall; and
   a fuel filler line, comprised of a curved L-shaped metal pipe, attached to the fuel filler receptacle and extending through the apertured luggage compartment wall.

* * * * *

UNITED STATES PATENT AND TRADEMARK OFFICE
CERTIFICATE OF CORRECTION

| | | |
|---|---|---|
| PATENT NO. | : 6,976,513 B2 | Page 1 of 1 |
| APPLICATION NO. | : 10/796828 | |
| DATED | : December 20, 2005 | |
| INVENTOR(S) | : Mark David Schlachter | |

It is certified that error appears in the above-identified patent and that said Letters Patent is hereby corrected as shown below:

Column 1, line 21, reads "located on the rear of vehicle along with" and should read --located on the rear of a vehicle along with--

Column 1, line 27, reads "on the center of vehicle's hood" and should read --on the center of a vehicle's hood--

Column 1, line 50, reads "the clean lines of vehicle," and should read --the clean lines of a vehicle,--

Column 2, line approx. 25-26, reads "the gas cap 10 accessible without having to raise the hood 12" and should read --the gas cap 10 is accessible without having to raise the hood 12--

Column 3, line approx. 25-26, reads "the description of… have generally referred to gasoline or gas," and should read --the description of... has generally referred to gasoline or gas,--

Signed and Sealed this

Eighteenth Day of July, 2006

JON W. DUDAS
*Director of the United States Patent and Trademark Office*